(12) United States Patent
Mills

(10) Patent No.: US 7,377,080 B2
(45) Date of Patent: May 27, 2008

(54) STOWABLE SPIRAL STAIRCASE SYSTEM FOR OVERHEAD SPACE ACCESS

(75) Inventor: Christopher J. Mills, Everett, WA (US)

(73) Assignee: The Boeing Company, Chicago, IL (US)

(*) Notice: Subject to any disclaimer, the term of this patent is extended or adjusted under 35 U.S.C. 154(b) by 835 days.

(21) Appl. No.: 10/708,855

(22) Filed: Mar. 29, 2004

(65) Prior Publication Data

US 2005/0210776 A1 Sep. 29, 2005

(51) Int. Cl.
*E04F 11/00* (2006.01)
*E04F 19/10* (2006.01)

(52) U.S. Cl. ............................ 52/187; 52/182; 52/183; 52/184; 52/191; 52/720.2; 182/40; 182/82; 182/85; 182/88; 182/106

(58) Field of Classification Search .................. 52/9, 52/10, 65, 182, 183, 184, 186, 187, 191, 52/720.2; 182/35, 40, 41, 82, 85, 88, 145, 182/106; 244/118.5; 280/166
See application file for complete search history.

(56) References Cited

U.S. PATENT DOCUMENTS

| | | | | |
|---|---|---|---|---|
| 4,022,404 A | * | 5/1977 | Greiss | 244/118.5 |
| 4,053,140 A | | 10/1977 | Clemens et al. | |
| 4,378,862 A | * | 4/1983 | Carmel | 182/106 |
| 5,088,248 A | * | 2/1992 | Manna | 52/187 |
| 5,213,191 A | * | 5/1993 | Tahara et al. | 198/328 |
| 5,311,965 A | * | 5/1994 | Wu | 182/85 |
| 5,397,143 A | | 3/1995 | Bird | |
| 5,551,372 A | * | 9/1996 | Nicholls | 119/474 |
| 6,425,457 B1 | | 7/2002 | Lundry | |
| 6,431,103 B1 | * | 8/2002 | Meyerdierks | 114/218 |
| 6,616,098 B2 | | 9/2003 | Mills | |
| 6,659,225 B2 | | 12/2003 | Olliges | |
| 6,679,334 B2 | | 1/2004 | Johnson et al. | |
| 2002/0182026 A1 | * | 12/2002 | Sandwith | 410/24 |
| 2003/0019976 A1 | * | 1/2003 | Cheung | 244/118.5 |
| 2007/0119654 A1 | * | 5/2007 | Akselsen | 182/48 |

OTHER PUBLICATIONS

"Viking-Life—collapsible spiral staircase." Internet Archive. Mar. 26, 2003. Viking Life-Saving Equipment. Aug. 7, 2007 <http://web.archive.org/web/20030418025432/www.viking-life.com/usr/viking/vikingdotcom.nsf/linkopen/Subcategory-OffshoreEvacuation-Selstair?opendocument>.*

* cited by examiner

*Primary Examiner*—Richard E. Chilcot, Jr.
*Assistant Examiner*—Branon C Painter
(74) *Attorney, Agent, or Firm*—Ostrager Chong Flaherty & Broitman P.C.

(57) ABSTRACT

A staircase system (2) includes a rail element (40) and multiple stair elements (42). Baluster elements (44) are coupled to the rail element (40) and to the stair elements (42). A center support system (46) is coupled to and supports the rail element (40) and the stair elements (42). The center support system (46) has a stowed state and a deployed state.

35 Claims, 7 Drawing Sheets

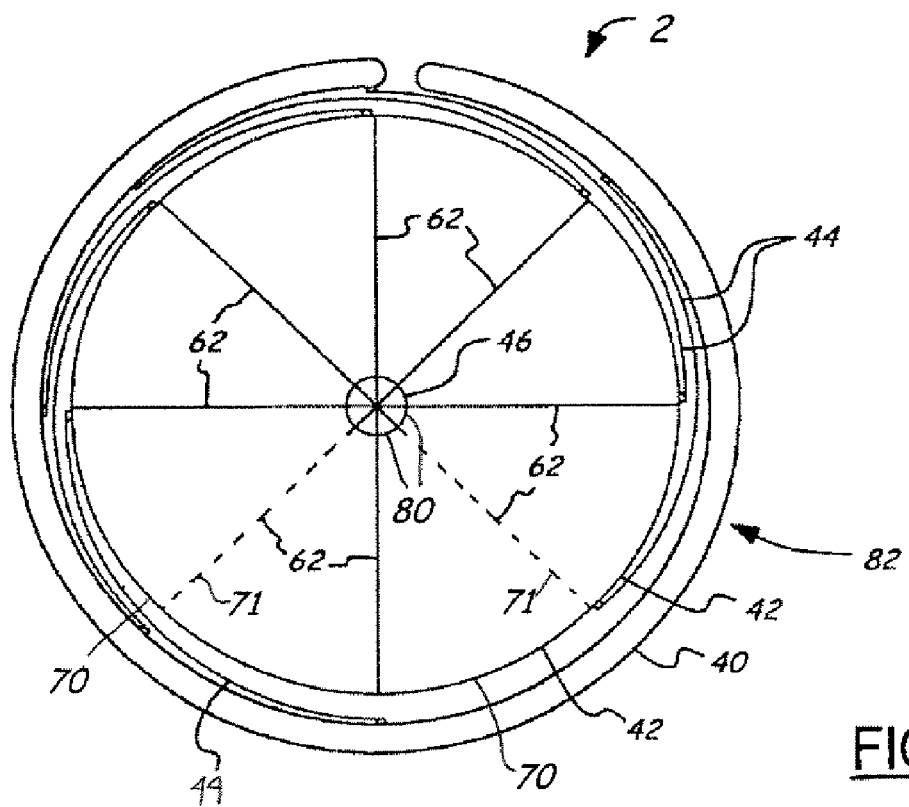
FIG. 5
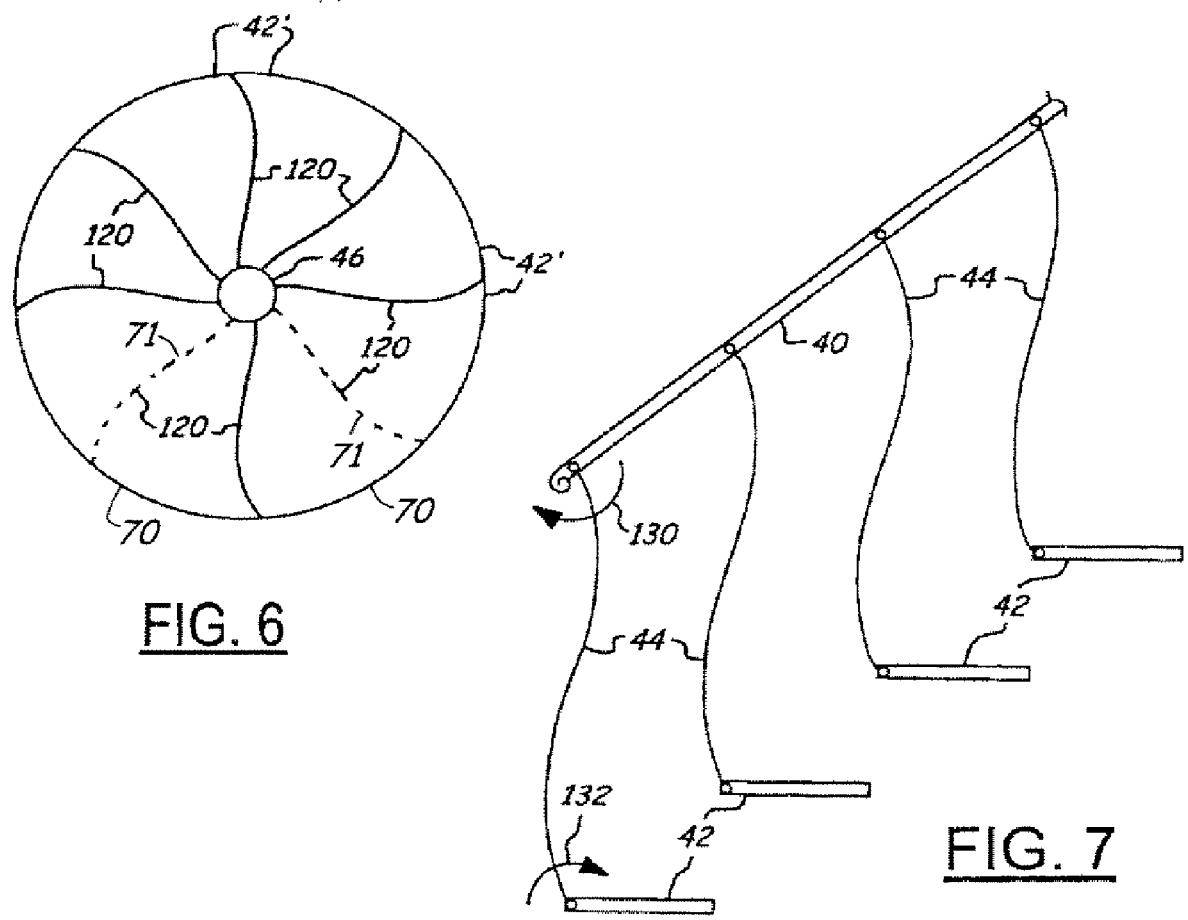
FIG. 6
FIG. 7

STOWABLE SPIRAL STAIRCASE SYSTEM FOR OVERHEAD SPACE ACCESS

BACKGROUND OF INVENTION

The present invention is related generally to staircase systems. More particularly, the present invention is related to stowable staircase systems that enable access to overhead areas of an aircraft.

Space within a crown of a wide body aircraft is typically not efficiently or fully utilized, due to the difficulty in access thereof. In order to maximize storage and seating area within a commercial passenger aircraft, efficient use of space within the aircraft is desired. Efficient use of aircraft space can increase the number of passengers transported per flight and the capability of an aircraft to store more items on board.

Increased efficiency of space usage not only increases physical capacity of an aircraft, but can also increase customer and crewmember satisfaction and revenue per flight. For example, and particularly with respect to long flights, additional space allows for increased storage of food, baggages, and other items of various sizes. Improved efficiency of space usage also provides increased space for passenger and crewmember seating, rest areas, and movement about the aircraft.

In larger aircrafts that are typically used for longer flights, overhead space modules, such as crew rest stations and additional storage compartments, are provided in the space between the curved top portion of the hull of the aircraft and the lowered ceiling of the aircraft. These overhead space modules are typically accessible by use of a fixed stairway module, which is typically a narrow and steep stairway. These fixed stairway modules result in loss of otherwise usable main deck space.

Thus, there exists a need for an improved space efficient staircase mechanism for access to overhead areas of an aircraft that utilizes a minimal amount of space in both a stowed and/or deployed arrangement, that is cost effective to manufacture and implement within an aircraft, and that is easy and convenient to utilize and operate.

SUMMARY OF INVENTION

The present invention provides a staircase system that includes a rail element and multiple stair elements. Baluster elements are coupled to the rail element and to the stair elements. A center support system is coupled to and supports the rail element and the stair elements. The center support system has a stowed state and a deployed state.

The embodiments of the present invention provide several advantages. One such advantage is the provision of a telescoping spiral staircase system that has both a compact stowed state and a space efficient deployed state.

A couple of other advantages provided by multiple embodiments of the present invention are the provisions of staircases that can be stowed within a ceiling or a floor of a vehicle or structure.

Another advantage provided by an embodiment of the present invention is the provision of a telescoping spiral staircase system that incorporates potential energy devices that aid in the stowage and/or deployment of the staircase system.

Yet another advantage that is provided by an embodiment of the present invention is the provision of a telescoping spiral staircase system that has a staging step element for easy performance of various tasks related to the accessing of an overhead area. For example, One is acting as a platform to stand one is acting as a table.

The present invention also provides versatility in the type and style of deployment mechanisms utilized within a spiral staircase system.

The present invention itself, together with further objects and attendant advantages, will be best understood by reference to the following detailed description, taken in conjunction with the accompanying drawing.

BRIEF DESCRIPTION OF DRAWINGS

FIG. 5 is a top view of the telescoping spiral staircase system of FIG. 3 in the stowed state and having stair elements with straight radial edges in accordance with an embodiment of the present invention;

FIG. 6 is a top view of stair elements in a stowed state and having curved radial edges in accordance with another embodiment of the present invention;

FIG. 7 is a side stretched view of a portion of the telescoping spiral staircase system of FIG. 3 illustrating baluster rotation from the deployed state to the stowed state in accordance with an embodiment of the present invention;

DETAILED DESCRIPTION

Figure 1:
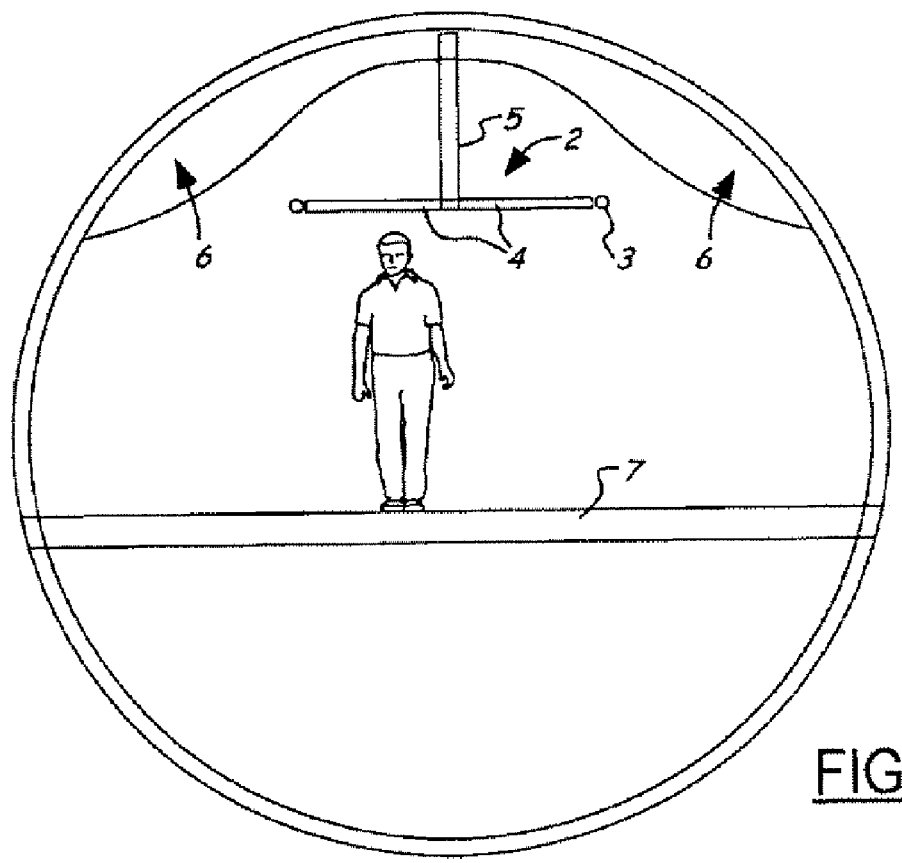
FIG. 1 is a side view of a telescoping spiral staircase system illustrating an overhead stowed state in accordance with an embodiment of the present invention.

In the following Figures the same reference numerals will be used to refer to the same components. While the present invention is described primarily with respect to telescoping spiral staircase systems for use within an aircraft, the present invention may be adapted and applied in various vehicle and non-vehicle applications. The present invention may be applied in aeronautical applications, nautical applications, railway applications, automotive vehicle applications, commercial and residential applications, as well as in other applications known in the art where space is limited and efficient use thereof is desired. Also, the staircase system of the present invention may be utilized to access overhead areas, to access rest areas, to ascend or descend between floors, or for other purposes known in the art.

In the following description, various operating parameters and components are described for one constructed embodiment. These specific parameters and components are included as examples and are not meant to be limiting.

Referring now to FIG. 1, a side view of a telescoping spiral staircase system 2 illustrating an overhead stowed state in accordance with an embodiment of the present invention is shown. The staircase system 2 includes a handrail element 3, multiple stair elements 4, and a center support system 5. The staircase system 2 is stowed between overhead areas 6 and may be manually pulled down to the floor 7 to access the areas 6. Another overhead spiral staircase system that has a similar handrail element, stair elements, and a center support system is shown in more detail with respect to FIG. 3.

Figure 2:
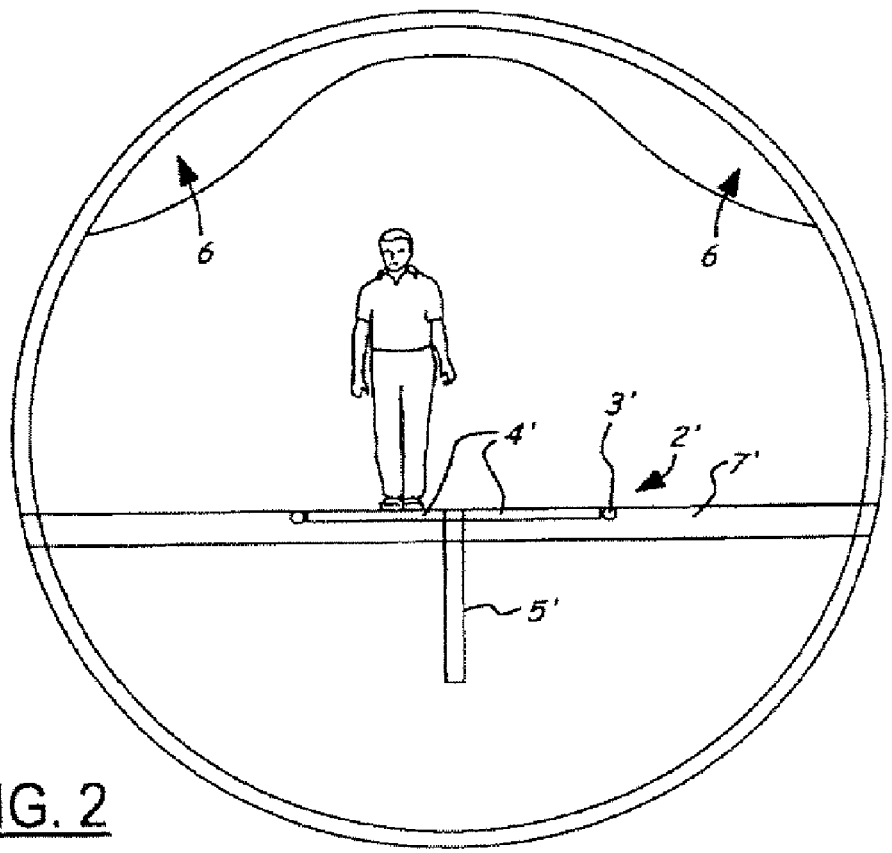
FIG. 2 is a side view of a telescoping spiral staircase system illustrating a floor stowed state in accordance with an embodiment of the present invention.

Referring now to FIG. 2, a side view of a telescoping spiral staircase system 2' illustrating a floor stowed state in accordance with an embodiment of the present invention is shown. The staircase system 2" is similar to the staircase system 2, but instead of being stowed between the overhead areas 6 is stowed in the floor 7'. The staircase system 2' is manually deployable from the floor 7'.

Figure 3A:
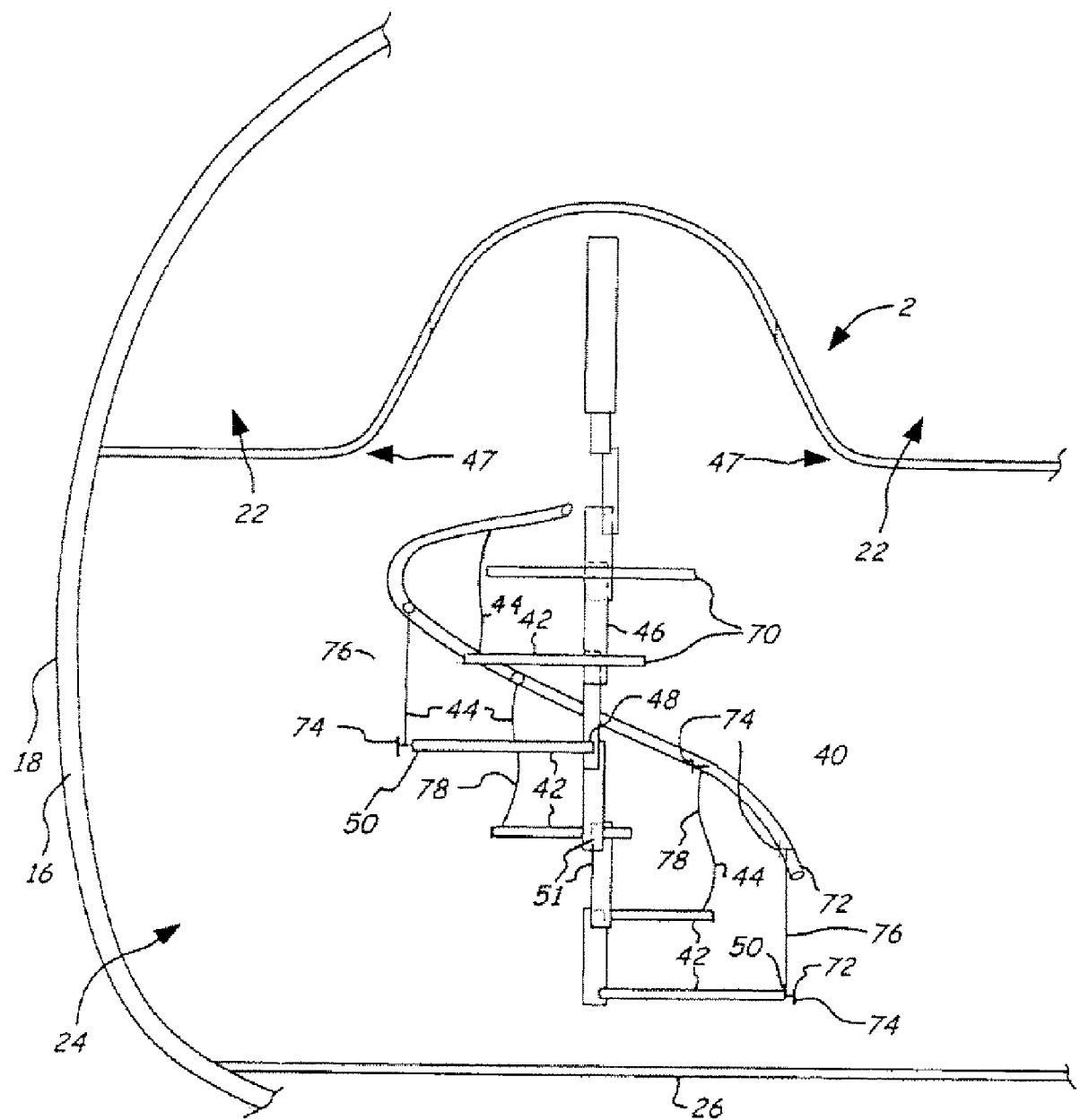
FIG. 3A is a side view of the telescoping spiral staircase system of FIG. 1 illustrating a deployed state in accordance with an embodiment of the present invention.
Figure 3C:
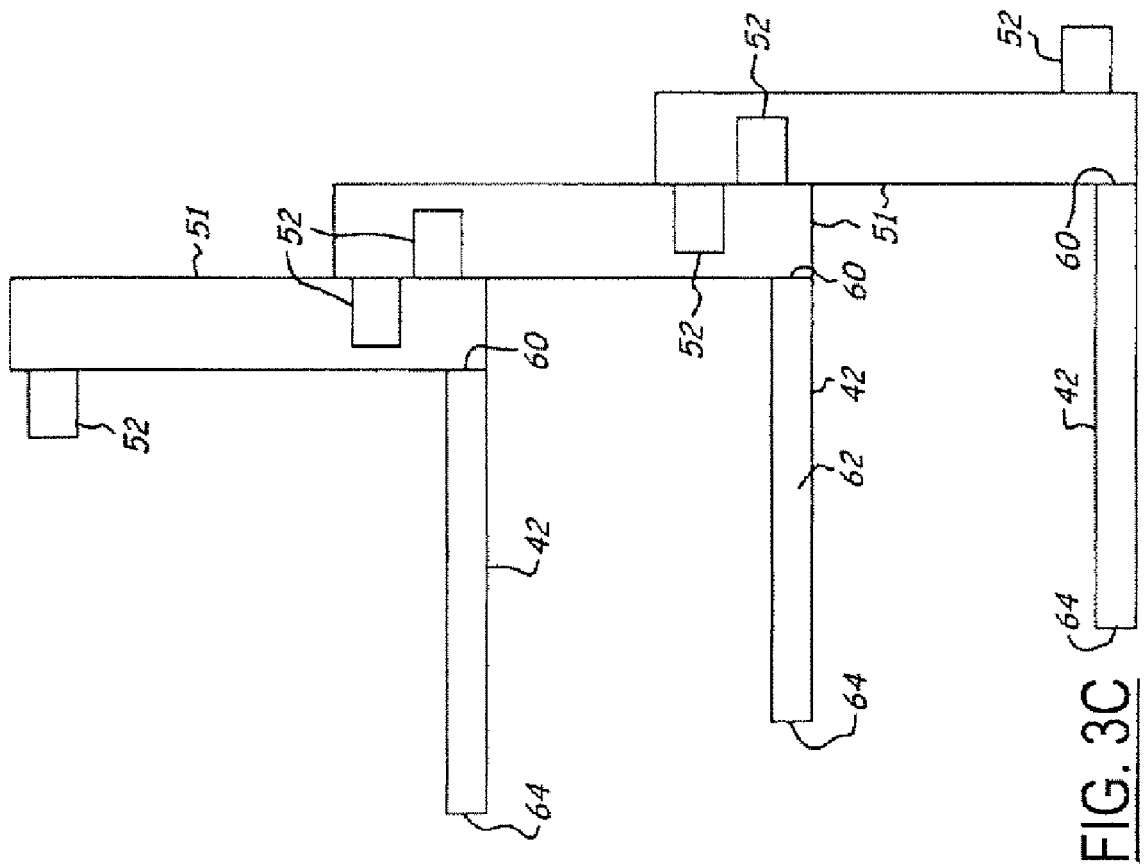
FIG. 3C is a side view of stair elements and corresponding telescoping elements of the telescoping spiral staircase system of FIG. 3 in accordance with another embodiment of the present invention.
Figure 3B:
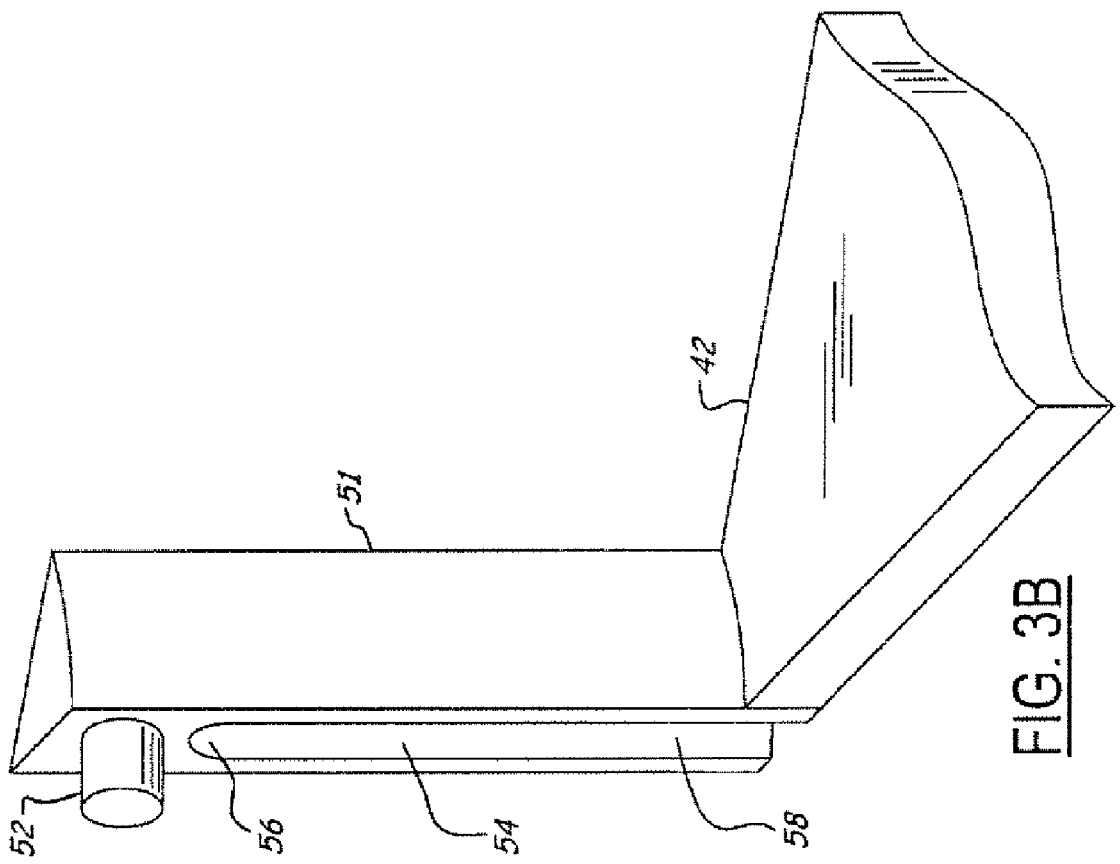
FIG. 3B is a perspective view of stair element and corresponding telescoping element of the telescoping spiral staircase system of FIG. 3 in accordance with another embodiment of the present invention.

Referring now to FIG. 3, a side view of the spiral staircase system 2 is shown in a deployed state. The staircase system 2 is shown for example purposes only as being located within an aircraft structure 16 of an aircraft 18; the staircase system 2 may be located in other areas of the aircraft 18. The structure 16 includes a ceiling 20, overhead areas 22, a main deck 24, and a floor 26. Overhead areas 22 are not limited to the space outboard of the staircase, but may also include areas forward and aft of the staircase. The overhead areas 22 are enclosed by overhead compartments (not shown) within the ceiling 20. The staircase system 10 aids crewmembers in accessing the overhead areas 22 and provides efficient use of the spaces above the ceiling 20 and within the main deck 24 when in both the stowed state and the deployed state.

The staircase system 2 includes one or more railing or handrail elements 40 (only one is shown), stair elements 42, baluster elements 44, and a center support system 46. The rail element 40 and the stair elements 42 are coupled to and are supported by the center support system 46. The rail element 40 and the stair elements 42 reside between and may be below, above, or flush with a lower portion 47 of the overhead areas 22 when stowed. The balusters 44 are coupled between the rail element 40 and the stair elements 42. The rail element 40 supports the balusters 44, which extend therefrom and in turn also supports the stair elements 42. The architecture of the staircase system 2 is such that the system 2 may be easily stowed in and deployed from the ceiling 20. The staircase system 2 may be easily modified to be stowed in and deployed from a floor, such as the floor 26. Stowage and deployment of the staircase system 2 is described in greater detail below.

Figure 4:
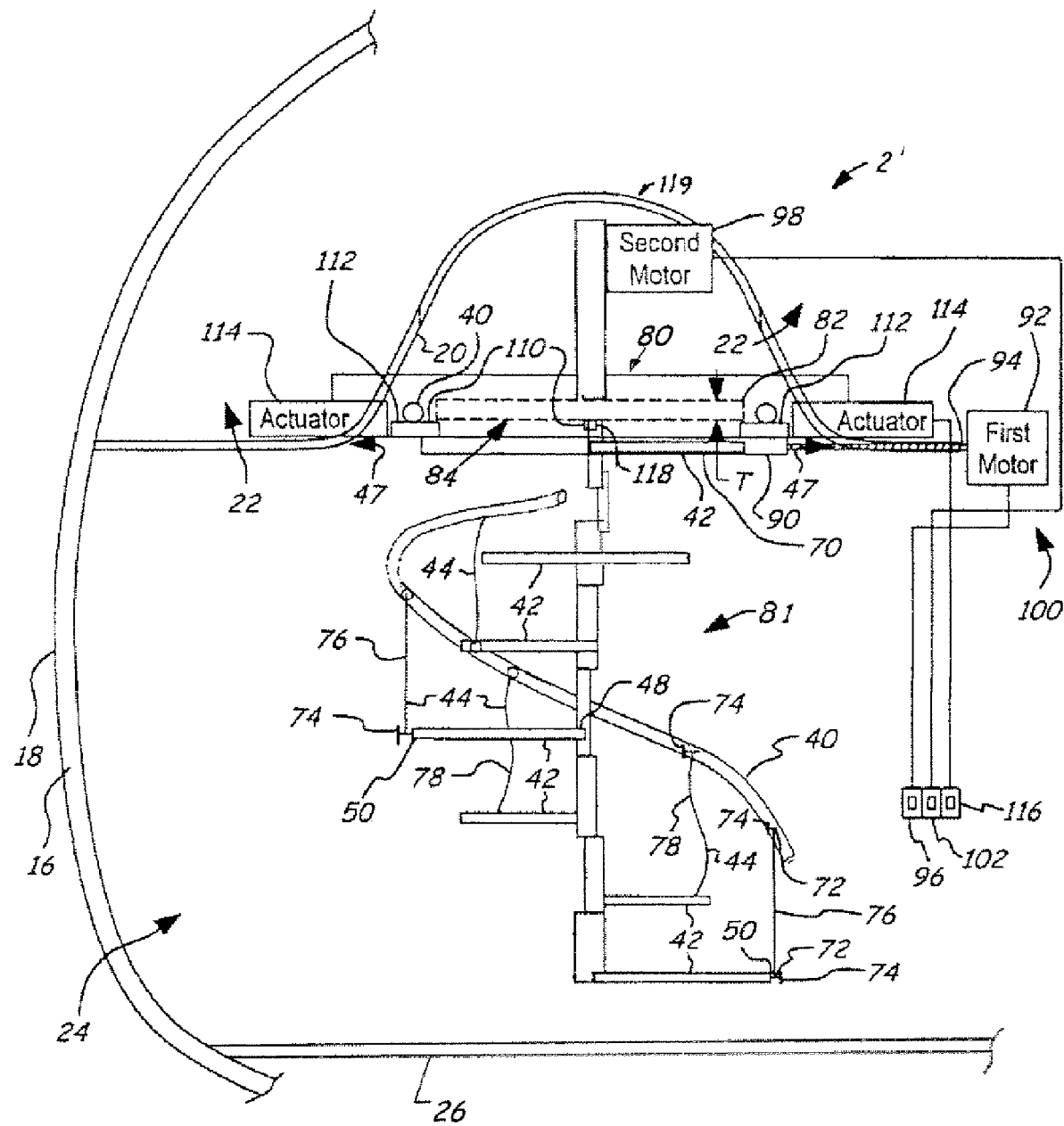
FIG. 4 is a side view of a telescoping spiral staircase system illustrating both a stowed state and a deployed state in accordance with another embodiment of the present invention.

In operation, the staircase system 2 may be uncovered and/or released, as described with the embodiment of FIG. 4, and deployed. When deployed the center support system 46 is extended and the stair elements 42 are helically oriented thereabout. Upon deployment of the staircase system 2, crewmembers may ascend the stair elements 42 to interact with or access the overhead areas 22.

The rail element 40 may be in the form of a potential energy device and aid in the stowage and/or deployment of the staircase system 2. The rail element 40 may be spring like in nature and biased when stowed or deployed. For example, when the staircase system 2 is stowed, the rail element 40 may be biased when deployed to assist in the collapsing or stowing of the staircase system 2. As such, the rail element 40 counter-balances the weight of the staircase system 2. As another example, when the staircase system 2 is stowed in a floor, such as floor 26, the rail element 40 may be biased when stowed to assist in the deployment of the staircase system 2. The rail element 40 can also aid in vertically supporting the staircase system 2.

The rail element 40 may rotate when the staircase system 2 is deployed depending upon the connections with the balusters 44 and the center support system 46. The rail element 40 is in the form of a helical spiral when deployed. The rail element 40 may be formed of aluminum, steel, a composite material, or a combination thereof, as well as of other lightweight materials known in the art. Although a single continuous rail element is shown, many rail element may be utilized, whereby each rail element is linked together to form a continuous rail.

The stair elements 42 are coupled on an inner side 48 to the center support system 46 and on an outer side 50 to the balusters 44. In the embodiments of FIGS. 3A-4, the stair elements 42 are rigidly coupled to telescoping elements 51, which have slot-coupling members 52. Although each stair element 42, telescoping element 51, and slot-coupling member 52 are shown as being rigidly coupled to each other to form a single unitary structure, they may be separate components. The slot-coupling members 52 reside within slot receptacles 54 of the telescoping elements 51. Each telescoping element 51 may have one or more slot receptacle. The stair elements 42 are guided vertically along the slot receptacles 54 when the staircase system 2 is actuated between the stowed state and the deployed state. The slot-coupling members 52 reside towards the upper ends 56 of the slot receptacles 54 when in the stowed stated and towards the lower ends 58 of the slot receptacles 43 when in the deployed state. When the staircase system 2 is stowed in a floor, as described above, this arranged is reversed, whereby the slot-coupling members 52 reside towards the lower ends 58 when the staircase system 2 is stowed and towards the upper ends 56 when the staircase system 2 is deployed.

Each stair element 42 has an inner edge 60, a pair of radial edges 62, and an outer edge 64. The inner edge 60 corresponds in shape to that of the center support system 46. Although the inner edge 60 is shown as semi-circular in shape, it may be of various other shapes, including straight and angular. The radial edges 62 may also be of various shapes, two examples of which are illustrated in the embodiments with respect to FIGS. 5 and 6. The outer edge 64 also although shown as semi-circular in shape, it may be of various other shapes.

The stair elements 42 when in the stowed state 12 may provide a flush surface with the ceiling 20, as stated above, or with a floor, such as floor 26. The stair elements 42, like the rail element 40, may be formed of aluminum, steel, a composite material, or a combination thereof.

The stair elements 42 may include one or more staging stair elements 70. In the example embodiment each staging element 70 is formed of two stair elements, which is indicated by dashed lines 71 in FIGS. 5 and 6. The staging elements 70 may be used to perform various tasks related to the accessing of the overhead areas 22. The staging elements 70 are at a fixed height that provides adequate clearance for a crewmember to stand underneath the staging elements 70. The staging stair elements 70 are coupled to the center support system 46, but are not necessarily coupled to the balusters 44. The staging elements 70 may be used as stair steps when supported by balusters or other adequate support mechanism.

The baluster elements 44 may have looped or eye shaped ends 72 that link or hook onto tabs 74 on the rail element 40 and the stair elements 42. Although a single baluster 44 is shown for each stair element 42, multiple balusters may be utilized per stair element. The balusters 44 may be in a fully extended, stretched, or substantially straight orientation when in the deployed state, as shown by balusters 76 and 78. Balusters 76 are similar to balusters 78, but due to their mounting location are viewed at a different angle and thus are shown on end, and thus appearing linear. The balusters 44 are in a curved orientation when stowed, which can best be seen in FIG. 8. The substantially straight orientation when deployed and the curved orientation when stowed of the balusters 44 provide an aesthetically pleasing appearance when deployed and aid in the stowing of the staircase system 2.

Figure 8:
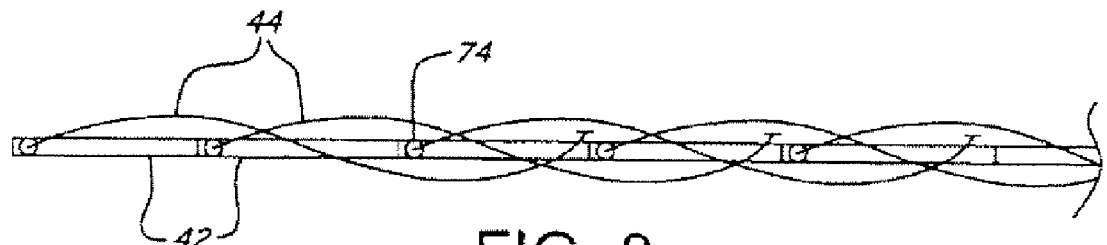
FIG. 8 is a side stretched view of the stair elements and balusters of the system of FIG. 3 illustrating a baluster nesting arrangement in accordance with an embodiment of the present invention.

The balusters 44 may also be in the form of potential energy devices, such that they assist in the stowage or deployment of the staircase system 2. The balusters 44 may be biased to assist in the contracting of the staircase system 2 into the stowed state or may assist in extending the staircase system 2 into the deployed state. The balusters 44 are generally in a curved stated, as stated, when stowed and may be in a nesting type configuration, as is best seen in FIG. 8. The balusters 44 may also be formed of various lightweight materials, such as aluminum, steel, a composite material, or a combination thereof.

The center support system 46 for the embodiments of FIGS. 3A-4 is formed of the telescoping elements 51, as stated above, which are interlocked and slide relative to each other. The telescoping elements 51 are "pie" cylindrical sections, which engage with and slide vertically relative to other adjacent elements. The pie cylindrical sections or telescoping elements 51 may be viewed from the top in FIG. 5. The center support system 46 may include any number of telescoping elements. The telescoping elements 51 may be of various sizes, shapes, and styles. The vertical length of the telescoping elements 51 is generally longer than the distance between sequential stair elements 42.

The rail element 40, the stair elements 42, and the baluster elements 44 form a thin flat circular disk-shaped structure 82 when in the stowed state. In one embodiment of the present invention, the disk-shaped structure 82 has a cross-sectional height or thickness T of approximately less than two inches, which is best seen in FIG. 4. This small thickness T allows the staircase systems 2 and 2", of the embodiments of FIGS. 3 and 4, to reside within a minimal amount of space when stowed. The staircase systems 2 and 2" also minimize space usage when deployed state, due the spiral architectural designs thereof.

Items may also be stored on the staircase systems 2 and 2" to maximize space efficiency within the aircraft 18. For example, items, such as baggages, may be placed on the stair elements 42 and then raised into the storage space 84 of the staircase system 2". When the staircase systems 2 and 2" are stowed in a floor, items to be stowed may be placed into a storage space of the staircase systems 2 and 2" before stowage thereof.

Referring now to FIG. 4, a side view of the telescoping spiral staircase system 2" illustrating both a stowed state 80 and a deployed state 81 in accordance with an embodiment of the present invention is shown. The stowed state 80 is shown in hidden line format.

Figure 9:
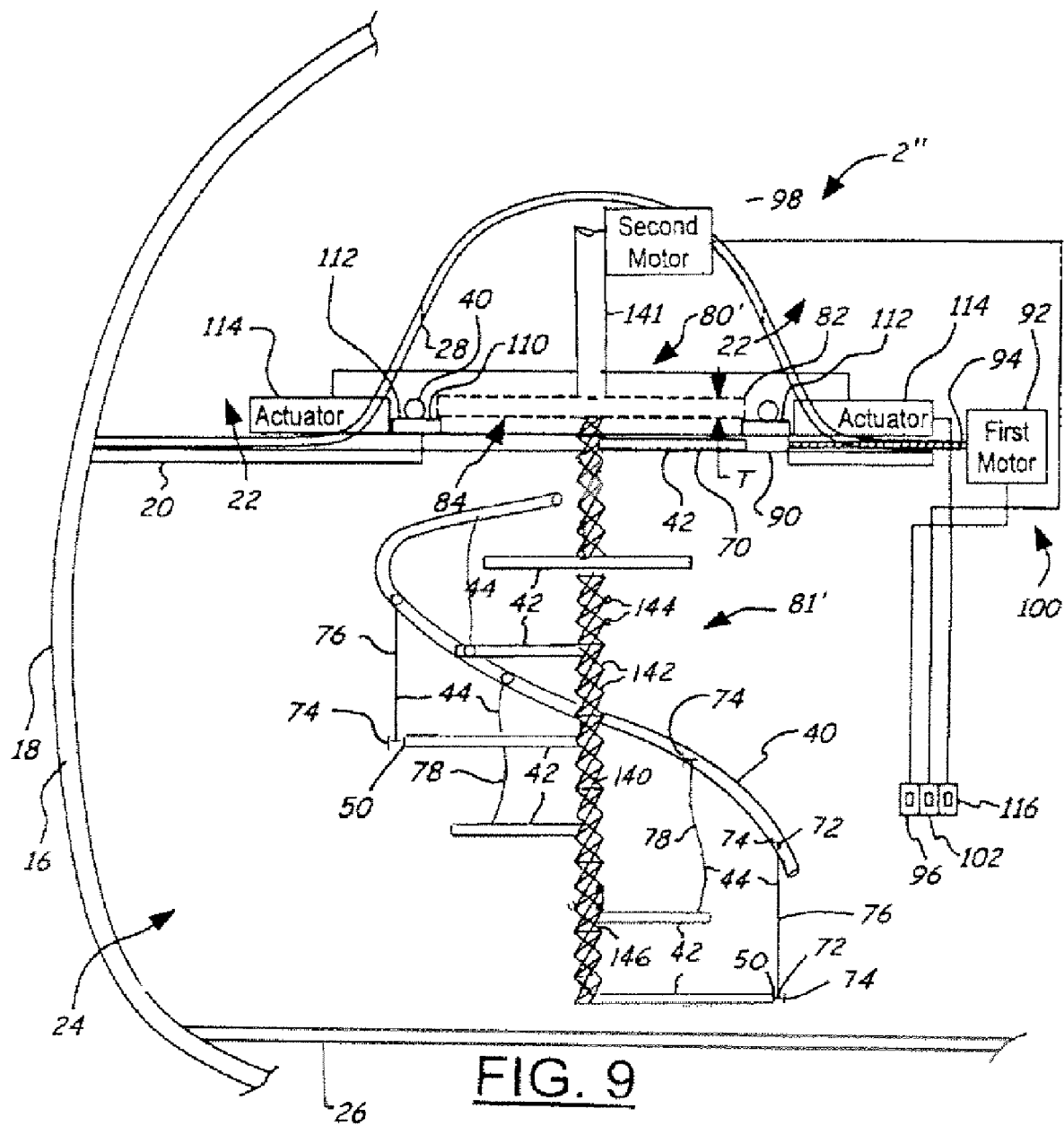
FIG. 9 is a side view of a staircase system incorporating a truss-based center support system in accordance with another embodiment of the present invention.

The staircase system 2" may form a flush surface with the ceiling 20 or with a floor when stowed. In an alternative embodiment, the staircase system 2" may also be recessed into the ceiling 20 or within a floor when stowed and have an associated staircase cover, such as cover 90, which conceals the staircase system 2", as shown in FIGS. 3, 8, and 9. When the staircase system 2" is stowed in a floor, the staircase cover 90 may have structural integrity to support the weight of crewmembers, service carts, and other objects standing, passing, or walking on or over the cover 90. The staircase cover 90 may be manually slid within the ceiling 20 or within a floor to reveal the staircase system 2" or may be automated such that the cover 90 is actuated via a first electronic motor 92, a gear 94, and an associated first switch 96.

The staircase system 2" may also be manually released, deployed, and stowed, especially with the use of potential energy elements or integral members that counterbalance the weight of the system 2". The staircase system 2" may also be automated and have a corresponding second motor 98 and electronic system 100 for actuation thereof. The second motor 98 is actuated via a second switch 102 that is readily accessible by a crewmember. The staircase system 2" may also be hydraulically or pneumatically actuated, using techniques known in the art.

The staircase system 2" may further include a deployment mechanism 110 with release mechanisms or elements 112. The release elements 112 have associated actuators 114 that are activated via a third switch 116. The actuators 114 may be activated automatically when the second motor 98 is activated. When the staircase system 2" is manually deployed a deployment handle 118 may be incorporated into the deployment mechanism 110. The deployment handle 118 may be coupled to the staircase system 2" in various locations and may be of various sizes, shapes, and styles.

The staircase system 2" may also include a lock or locking system 119. The locking system 119 is used to maintain the staircase system 2" in a fixed position when stowed or deployed. The locking system 119 may utilize the second motor 98, as shown, to lock the staircase system 2" in a fixed position or may utilize other locking components or devices known in the art, such as the actuators 114 and manual locks or latches (not shown). The locking system 119 may also be of various types and styles.

Referring now to FIG. 5, a top view of the telescoping spiral staircase system 2 in the stowed state 80 in accordance with an embodiment of the present invention is shown. The staircase system 2, as stated above, when in the stowed state 80 forms the disk-shaped structure 82. The staircase system 2, although may include any number of stair elements, is shown as having eight stair elements 42 that are arranged as "pieces of a pie" each stair element 42 forms a piece of the pie. The rail element 40 and the balusters 44 are arced around the pie or stair elements 42.

Referring now to FIG. 6, a top view of stair elements 42" in a stowed state and having curved radial edges 120 in accordance with another embodiment of the present invention is shown. The shape of the stair elements 42" or the radial edges 120 are designed for aesthetic, ergonomic, and human utilization factors.

Referring now to FIG. 7, a side stretched view of a portion of the telescoping spiral staircase system 2 illustrating baluster rotation from deployed to stowed in accordance with an embodiment of the present invention is shown. The balusters 44 when transitioning between and the stowed state and the deployed state tend to rotate clockwise relative to the rail element 40, as is depicted by a first arrow 130. The balusters 44 also tend to rotate clockwise relative to the stair elements 42, as depicted by a second arrow 132. The result of the above stated rotations is illustrated by the nesting configuration of FIG. 8.

Referring now to FIG. 8, a side stretched view of the stair elements 42 and the balusters 44 illustrating a curved orientation or baluster nesting arrangement in accordance with an embodiment of the present invention is shown. In the stowed state, the balusters 44 are nested such that interference is minimized therebetween. The nesting of the balusters 44 allows for smooth transitioning between the stowed stated and the deployed state.

The telescoping center support system 46 of FIGS. 3 and 4 may be replaced with other telescoping center support systems. Two such replacements are shown in the embodiments of FIGS. 9 and 10.

Referring now to FIG. 9, a side view of a staircase system 2"" incorporating a truss-based center support system 140 in accordance with another embodiment of the present invention is shown. The truss-based system 140 is also shown in both a stowed state 80" and a deployed state 81". When in the stowed state 80", the truss-based system resides within a can 141. The truss-based system 140 includes multiple triangular truss elements 142, which are coupled via links 144.

The truss elements 142 and/or links 144 may also be potential energy devices, which assist in the stowage or deployment of the staircase system 2"". The links 144 allow the truss elements 142 to rotate relative to each other, and thereby allow the truss-based system 140 to extend and support the rail element 40 and the stair elements 42. The truss elements 142 may also be formed of various lightweight materials known in the art. In an embodiment of the present invention, the stiffness of the truss elements 142 is high to prevent swaying of the truss-based system 140. The stair elements 42 may couple directly to associated truss elements 142 or via truss couplers 146 as the truss-based system 140 is deployed.

Figure 10:
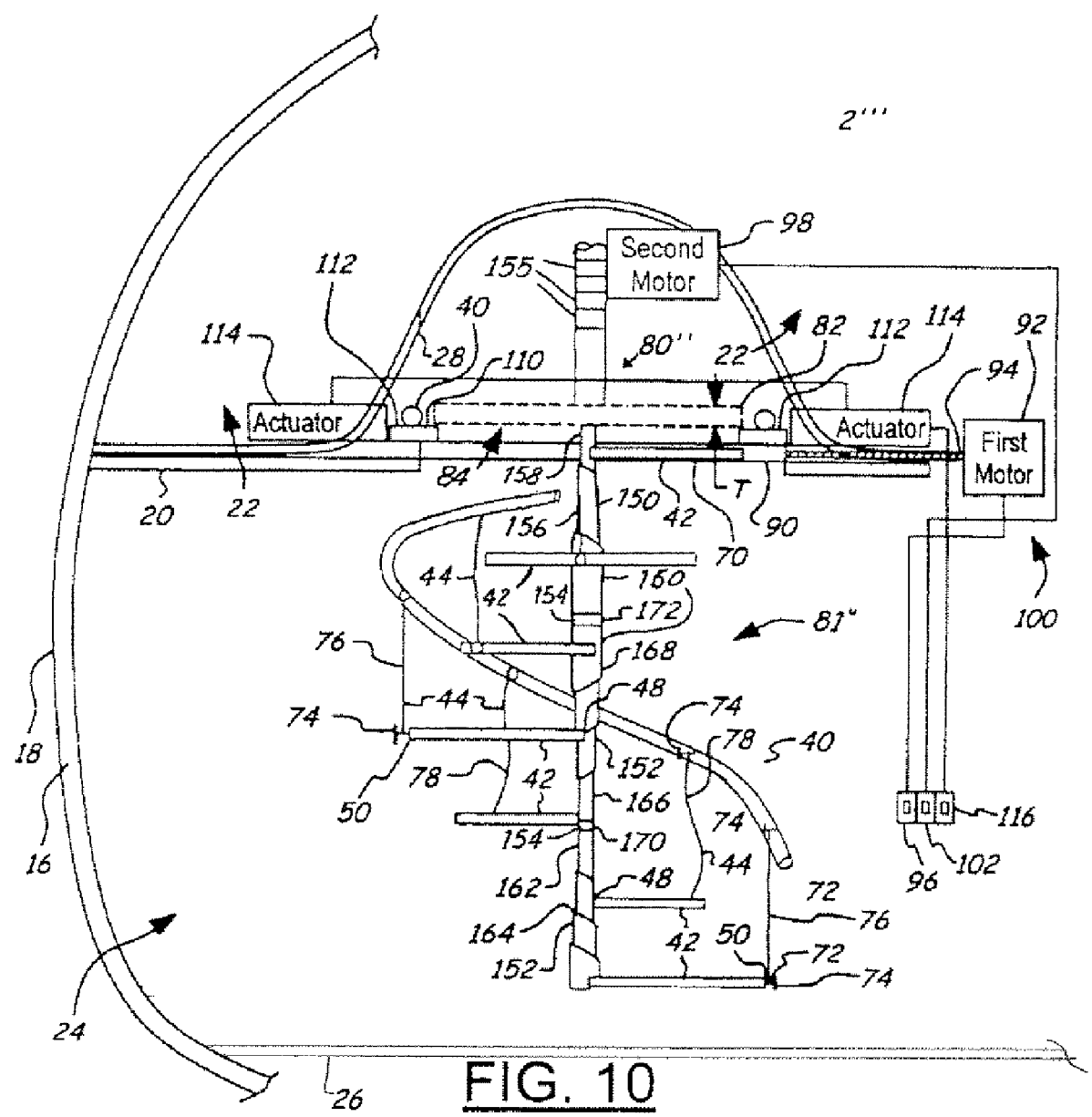
FIG. 10 is a side view of a staircase system incorporating a helically wound tubular structure with still another embodiment of the present invention.

Referring now to FIG. 10, a side view of a staircase system 2""' incorporating a helically wound tubular structure 150 with still another embodiment of the present invention is shown. The helical structure 150 is also shown in both a stowed state 80"" and a deployed state 81"". The helical structure 150 includes ribbon coil structures 152 and interlocking elements 154, which may be daisy-chained together. The ribbon structures 152 when in the stowed state are "coiled up" such that they form rolls 155.

The ribbon structures 152 have coils 156 with inner portions 158 and outer portions 160. The ribbon structures 152 are alternated in orientation such that, for example, an inner portion 162 of a first ribbon structure 164 is coupled to an inner portion 166 of a second ribbon structure 168. This is similar for the outer portions 160. The inner portions 158 are coupled via inner interlocking elements 170 and the outer portions 160 are coupled via outer interlocking elements 172. The inner interlocking elements 170 are smaller in size than the outer interlocking elements 172. The ribbon coil structures 152 and the interlocking elements 154 may be formed of various lightweight materials and may also be biased to assist stowage or deployment of the staircase system.

Figure 11:
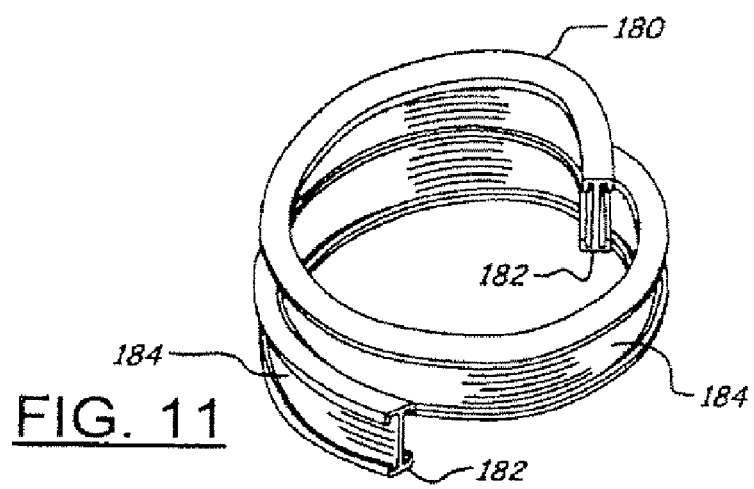
FIG. 11 is a sample-interlocking element that may be utilized in the helically wound tubular structure of FIG. 10 in accordance with an embodiment of the present invention.

Referring now also to FIG. 11, a sample-interlocking element 180, that may be utilized in replacement of the interlocking element 154, is shown in accordance with an embodiment of the present invention. The interlocking element 180 includes hooked ends 182 for interlocking with the inner portions 158 and outer portions 160. The interlocking element 180 may be fixed in height or may also be expandable as shown. The hooked ends 182 extend the length of the interlocking element 180 and interlock to each other between coils 184.

The present invention provides a telescoping spiral staircase system that can be conveniently stowed in a compact arrangement within a ceiling or floor. The present invention can be constructed so that its members store and/or release potential energy in order to aid in its deployment and reduce the need for additional counterbalances and/or mechanisms. The present invention may be applied in various applications and provides efficient use of space and increased storage ability.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A staircase system comprising:
   at least one rail element;
   a plurality of stair elements;
   a plurality of baluster elements coupled to said at least one rail element and to said plurality of stair elements, said at least one rail element supporting said plurality of baluster elements which extend from said at least one rail element and in turn also support said plurality of stair elements; and
   a center support system comprising a plurality of telescoping elements, said center support system being coupled to and supporting said at least one rail element and said plurality of stair elements, said center support system having a stowed state and a deployed state, wherein when in the deployed state said center support system is extended and said plurality of stair elements are helically oriented thereabout.

2. A system as in claim 1 wherein said at least one rail element is in the form of a potential energy device.

3. A system as in claim 1 wherein said at least one rail element assists in contracting said center support system into said stowed state.

4. A system as in claim 1 wherein said at least one rail element assists said center support system into said deployed state.

5. A system as in claim 1 wherein said at least one rail element is formed of at least one material selected from aluminum, steel, and a composite material.

6. A system as in claim 1 wherein said plurality of stair elements comprise:
   a plurality of outer edges; and
   a plurality of radial edges.

7. A system as in claim 6 wherein said plurality of outer edges substantially form a circle when said center support system is in said stowed state.

8. A system as in claim 6 wherein said plurality of radial edges comprise straight radial edges.

9. A system as in claim 6 wherein said plurality of radial edges comprise curved radial edges.

10. A system as in claim 1 wherein said plurality of stair elements comprise at least one staging stair element.

11. A system as in claim 10 wherein said staging stair element is at a fixed height for human standing clearance.

12. A system as in claim 10 wherein said staging stair element is in the form of a step.

13. A system as in claim 1 wherein said plurality of baluster elements are in the form of potential energy devices.

14. A system as in claim 1 wherein said plurality of baluster elements assist in contracting said center support system into said stowed state.

15. A system as in claim 1 wherein said plurality of baluster elements assist said center support system into said deployed state.

16. A system as in claim 1 wherein said plurality of baluster elements are formed of at least one material selected from aluminum, steel, and a composite material.

17. A system as in claim 1 wherein said plurality of baluster elements are in a curved state when said center support system is in said stowed state.

18. A system as in claim 1 wherein said plurality of baluster elements are in a substantially straight state when said center support system is in said deployed state.

19. A system as in claim 1 wherein said plurality of baluster elements are in a nesting arrangement when said center support system is in said stowed state.

20. A system as in claim 1 wherein said at least one rail element, said plurality of stair elements, and said plurality of baluster elements form a disk-shaped structure when said center support system is in said stowed state.

21. A system as in claim 20 wherein said disk-shaped structure has a cross-sectional height of less than approximately two inches.

22. A system as in claim 1 wherein said center support system telescopes between said stowed state and said deployed state.

23. A system as in claim 1 wherein said at least one rail element, said plurality of stair elements, said plurality of baluster elements, and said center support system are stowable in a ceiling.

24. A system as in claim 1 wherein said at least one rail element, said plurality of stair elements, said plurality of baluster elements, and said center support system are stowable in a floor.

25. A system as in claim 1 further comprising a deployment mechanism coupled to said center support system.

26. A system as in claim 25 wherein said deployment mechanism comprises: a deployment handle coupled to said center support system; and at least one release mechanism releasing said center support system.

27. A system as in claim 1 further comprising a locking system maintaining position of said plurality of stair elements and said center support system.

28. A method of accessing an overhead area comprising:
releasing a staircase system;
deploying said staircase system comprising extending a telescoping center support system of said staircase system;
ascending a plurality of circular stair elements of said staircase system; and
interacting with the overhead area.

29. A method as in claim 28 wherein deploying said staircase system comprises helically orienting said plurality of circular stair elements about said telescoping center support system.

30. An overhead space access stowable spiral staircase system comprising:
at least one circular rail element;
a plurality of stair elements, each of said plurality of stair elements having a circular outer edge;
a plurality of baluster elements coupled to said at least one rail element and to said plurality of stair elements; and
a center support system coupled to and supporting said at least one rail element and said plurality of stair elements, said center support system having a stowed state and a deployed state;
wherein when in the deployed state, said center support system is extended and said plurality of stair elements are helically oriented thereabout.

31. A system as in claim 30 wherein said at least one circular rail element, said plurality of stair elements, said plurality of baluster elements, form a disk-shaped structure when said center support system is in said stowed state.

32. An aircraft comprising:
an aircraft structure having at least one overhead area; and
a staircase system comprising;
at least one rail element;
a plurality of stair elements;
a plurality of baluster elements coupled to said at least one rail element and to said plurality of stair elements, said at least one rail element supporting said plurality of baluster elements which extend from said at least one rail element and in turn also support said plurality of stair elements; and
a center support system coupled to and supporting said at least one rail element and said plurality of stair elements, said center support system having a stowed state and a deployed state, wherein when in the deployed state, said center support system is extended and said plurality of stair elements are helically oriented thereabout;
said center support system when in said deployed state providing access to said overhead area.

33. An aircraft as in claim 32 wherein said staircase system is stowable into a ceiling.

34. An aircraft as in claim 32 wherein said staircase system is stowable into a floor.

35. A staircase system comprising:
at least one rail element;
a plurality of stair elements;
a plurality of baluster elements coupled to said at least one rail element and to said plurality of stair elements, said at least one rail element supporting said plurality of baluster elements which extend from said at least one rail element and in turn also support said plurality of stair elements; and
a center support system comprising a plurality of telescoping elements, said center support system being coupled to and supporting said at least one rail element and said plurality of stair elements, said center support system having a stowed state and a deployed state, wherein said plurality of telescoping elements comprise a plurality of slot receptacles for position guidance of a plurality of stair element slot coupling members when transitioning between said stowed state and said deployed state and wherein when in the deployed state said center support system is extended and said plurality of stair elements are helically oriented thereabout.

* * * * *